United States Patent [19]
Zannucci et al.

[11] 3,961,975
[45] June 8, 1976

[54] TITANIUM DIOXIDE PIGMENTED CELLULOSIC POLYMER COMPOSITIONS WITH IMPROVED VISIBLE AND ULTRAVIOLET LIGHT STABILITY

[75] Inventors: Joseph S. Zannucci; Gerald R. Lappin, both of Kingsport, Tenn.

[73] Assignee: Eastman Kodak Company, Rochester, N.Y.

[22] Filed: Jan. 7, 1975

[21] Appl. No.: 539,193

[52] U.S. Cl. ............................... 106/176; 106/189; 106/193 P
[51] Int. Cl.² ...................... C08L 1/08; C08L 1/14
[58] Field of Search .................. 106/189, 176, 178; 260/429.9, 45.75 R

[56] References Cited
UNITED STATES PATENTS

| | | | |
|---|---|---|---|
| 3,189,630 | 6/1965 | Smutny | 260/45.75 R |
| 3,864,354 | 2/1975 | Irick et al. | 106/176 |
| 3,886,117 | 5/1975 | Havinga | 106/178 |

*Primary Examiner*—Theodore Morris
*Attorney, Agent, or Firm*—Elliott Stern; Daniel B. Reece, III

[57] ABSTRACT

The zinc or manganese salt of a 3,5-di-tert-alkyl-4-hydroxybenzoic acid, in combination with either a 2-hydroxybenzophenone or a 2-(2H-benzotriazol-2-yl)phenol provide highly effective synergistic stabilizer systems for $TiO_2$-pigmented cellulosic polymers.

8 Claims, No Drawings

TITANIUM DIOXIDE PIGMENTED CELLULOSIC POLYMER COMPOSITIONS WITH IMPROVED VISIBLE AND ULTRAVIOLET LIGHT STABILITY

This invention relates to the stabilization of polymer compositions, and more particularly to the stabilization of titanium dioxide-pigmented cellulosic polymer compositions against deterioration of physical properties resulting from exposure to sunlight or ultraviolet light.

Thermal plastic compositions such as cellulose acetate, cellulose acetate propionate and cellulose acetate butyrate have found wide acceptance as useful materials for making foils, films, fibers and molded articles. These articles are inherently strong, can be made dimensionally stable or sufficiently flexible to suit the requirements of their intended use, and are relatively inert to common household cleansing agents and solvents. However, such articles are unfortunately subject to rapid and severe degradation and deterioration, as evidenced by changes in the physical properties of the polymers, due to the effects of light, and particularly ultraviolet light. Such photodegradation is particularly evidenced by surface cracking, increased brittleness, loss of dielectric properties and discoloration of the polymer. Polymer compositions which contain titanium dioxide pigment are frequently even more difficult to stabilize against photodegradation by sunlight. This pigment renders some polymers more susceptible to photodegradation than is the unpigmented polymer. The addition of the usual ultraviolet absorbers to such formulations generally povides little enhancement of this photostability. The compositions of this invention contain highly effective stabilizer formulations for titanium dioxide-pigmented cellulosic polymers.

According to one embodiment of this invention there is provided a titanium dioxide-pigmented cellulosic polymer normally susceptible to degradation due to visible or ultraviolet light mixed with a stabilizing amount of the following components 1 and 2 as follows:

1. a compound having the formula

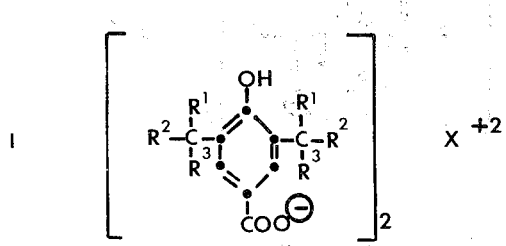

wherein $R^1$ to $R^3$ are the same or different and each represents an alkyl radical having 1 to 8 carbon atoms; $X^{+2}$ is $Mn^{+2}$ or $Zn^{+2}$; and 2. a compound selected from (a) compounds having the formula:

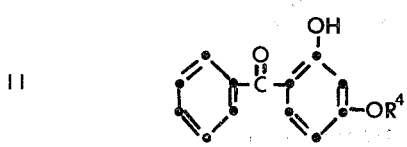

or (b) compounds of the formula:

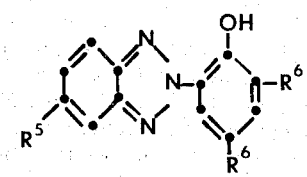

wherein $R^4$ is the same or different and represents hydrogen or an alkyl radical, $R^5$ represents hydrogen or chloro, and each $R^6$ is the same or different and represents hydrogen or an alkyl radical, each of said components being utilized in an amount of from about 0.01 to about 5.0 weight percent based on the polymer with an upper limit such that the sum of all such percentages of said components does not exceed 5 percent based on the weight of the polymer.

In a preferred embodiment of this invention the titanium dioxide-pigmented polymer is a cellulose acetate, cellulose acetate propionate, or cellulose acetate butyrate polymer; each of $R^1$ to $R^3$ is an alkyl radical of 1 to 2 carbon atoms; $X^+$ is $Zn^{+2}$ or $Mn^{+2}$; $R^4$ is an alkyl radical of 1 to 12 carbon atoms; $R^5$ is hydrogen or chloro; and $R^6$ is hydrogen or lower alkyl.

As used herein the term "alkyl" designates a straight or branched radical having a carbon content of from one to about eighteen carbon atoms, and the term "lower alkyl" designates a carbon content of from one to about six carbon atoms.

Compounds similar to those described by Formulas I, II and III have been described in various patents such as U.S. Pat. No. 3,189,630, British Pat. No. 991,591, U.S. Pat. No. 3,112,338 and U.S. Pat. No. 3,632,551. However, none of these patents reveal the unexpected and advantageous effect obtained when titanium dioxide-pigmented cellulosic polymers are blended with a compound having the Formula I as described above and either a compound selected from Formula II or Formula III as described above.

The stabilized polymers produced in accordance with this invention can be prepared by dissolving the additive components in a suitable solvent and coating particles of the polymer with the solution followed by drying so as to remove the solvent. These particles are useful for the manufacture of shaped objects such as fibers, films, rods, tubes, molded objects, etc. Another method for preparing the stabilized polymers of this invention comprises mixing the additives into the polymer on hot mill rolls. The melt polymer can then be extruded into a shaped object such as fibers or film or other molded objects. Alternatively, the mill polymers can be granulated and used for injection molding. Other methods for incorporating the additives (stabilizing components) into polymers are self-evident to those skilled in the art.

The amounts of various additive components which can be employed depend upon the degree of stability desired, the amount of deleterious residues in the polymer to be stabilized, etc. It is considered that 5% by weight (sum of all stabilizing components) would be the maximum required for preventing degradation of the polymers under severe conditions. In some instances as little as 0.1% of each additive will be adequate to prevent visible and ultraviolet light degradation. Generally, any one of the additives should not be used in an amount greater than ten times the weight of any other additive that may be present.

The term "cellulosic polymers" as used herein refers to those polymers such as cellulose acetate that is 37–40% acetyl groups and having a viscosity range of 0.5–100 sec. (ASTM Method D-871); cellulose acetate propionate having 39–48% propionyl groups, 1.5–10% acetyl groups and a viscosity range of 0.2–20 sec. (ASTM Method D-871); and cellulose acetate butyrate having 15–55% butyryl groups, 1.5–30% acetyl groups, and a viscosity range of 0.2–20 sec. (ASTM Method D-871). The above polymers are well known in the art and may be used for fibers, moldings and powder coatings.

Examples of stabilizers identified by Component (1), Formula I, are the zinc or manganese salts of 3,5-dialkyl-4-hydroxybenzoic acid such as manganese bis(3,5-di-tert-butyl-4-hydroxybenzoate), zinc bis(3,5-di-tert-butyl-4-hydroxybenzoate), manganese bis(3,5-di-tert-amyl-4-hydroxybenzoate), and manganese bis(3,5-dicyclohexyl-4-hydroxybenzoate).

Compounds representative of those stabilizers having the Formula II include 2-hydroxybenzophenone, 2,4-dihydroxybenzophenone, 4-(octyloxy)-2-hydroxybenzophenone, 4-(dodecyloxy)-2-hydroxybenzophenone, 4-methoxy-2-hydroxybenzophenone, 4-(octadecyloxy)-2-hydroxybenzophenone, etc.

Compounds repesentative of the triazoles corresponding to Formula III are as follows: 2-(2H-benzotriazol-2-yl)-4,6-di-tert-pentylphenol, 2-(2H-benzotriazol-2-yl)-p-cresol, 2-tert-butyl-6-(5-chloro-2H-benzotriazol-2-yl)-p-cresol, etc. Compounds of this type are described in U.S. Pat. No. 3,004,896, U.S. Pat. No. 3,467,482, and British Pat. No. 922,943.

The following examples further illustrate the invention.

EXAMPLE 1

The additives listed in the following Table I are incorporated into Tenite butyrate plastic (Formula 433A 22300MH), a cellulose acetate butyrate product of the Tennessee Eastman Company, by hot roll compounding. Films (5 mil nominal thickness) are pressed from these compositions, inserted in Pyrex test tubes and exposed in a Rayonet reactor (310-nm. lamps and 65°–70°C. air temperature) until brittle. The results of these tests are shown in Table I.

TABLE I

Stabilization Effectiveness of the Zinc and Manganese Salts of 3,5-Di-tert-butyl-4-hydroxybenzoic Acid Alone and in Combination With Ultraviolet Absorbers in TENITE Butyrate Films Pigmented with 5% Ti-Pure R-100 Titanium Dioxide

| Additive (Percent) | Days to Embrittlement |
|---|---|
| Control | 17 |
| 2-Hydroxy-4-methoxybenzophenone (1%) | 25 |
| 2-(2H-Benzotriazol-2-yl)-p-cresol(1%) | 35 |
| Zinc bis(3,5-di-tert-butyl-4-hydroxybenzoate) (1%) | 144 |
| Manganese bis (3,5-di-tert-butyl-4-hydroxybenzoate) (1%) | 100 |
| Zinc bis(3,5-di-tert-butyl-4-hydroxybenzoate) (1%) + 2-(2H-benzotriazol-2-yl)-p-cresol | |

TABLE I-continued

Stabilization Effectiveness of the Zinc and Manganese Salts of 3,5-Di-tert-butyl-4-hydroxybenzoic Acid Alone and in Combination With Ultraviolet Absorbers in TENITE Butyrate Films Pigmented with 5% Ti-Pure R-100 Titanium Dioxide

| Additive (Percent) | Days to Embrittlement |
|---|---|
| (1%) | >266 |
| Zinc bis(3,5-di-tert-butyl-4-hydroxybenzoate) (1%) + 2-hydroxy-4-methoxybenzophenone (1%) | >266 |
| Manganese bis(3,5-di-tert-butyl-4-hydroxybenzoate) (1%) + 2-(2H-benzotriazol-2-yl)-p-cresol (1%) | >266 |
| Manganese bis(3,5-di-tert-butyl-4-hydroxybenzoate) (1%) 2-hydroxy-4-methoxybenzophenone (1%) | >266 |

EXAMPLE 2

The additives listed in Table I are incorporated into titanium dioxide pigmented cellulose acetate and cellulose acetate propionate polymer with similar results being obtained.

Although the invention has been described in considerable detail with particular reference to certain preferred embodiments thereof, variations and modifications can be effected within the spirit and scope of the invention.

We claim:

1. Composition comprising a titanium dioxide-pigmented cellulosic polymer normally susceptible to degradation due to visible or ultraviolet light mixed with a stabilizing amount of the following components (I) and (II):

I. a compound having the formula

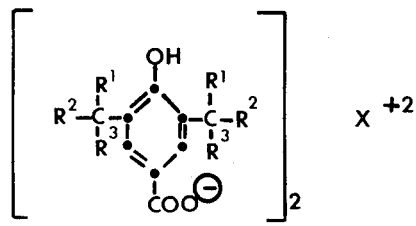

wherein $R^1$ to $R^3$ are the same or different and each represents an alkyl radical having 1 to 8 carbon atoms; $X^{+2}$ is $Mn^{+2}$ or $Zn^{+2}$; and II. a compound selected from (a) compounds having the formula:

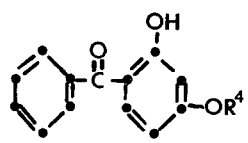

or (b) compounds of the formula:

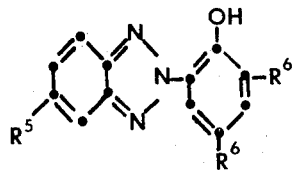

wherein R[4] represents hydrogen or an alkyl radical, R[5] represents hydrogen or chloro, each R[6] is the same or different and represents hydrogen or an alkyl radical, each of said components being utilized in an amount of from about 0.01 to about 4.0 weight percent based on the weight of the polymer with an upper limit such that the sum of all such percentages of said components does not exceed 5 weight percent based on the weight of the polymer.

2. Composition according to claim 1 wherein R[1], R[2] and R[3] are methyl or ethyl; R[4] is an alkyl radical having one to twelve carbon atoms; R[6] is hydrogen or lower alkyl; and X[+2] is Zn[+2].

3. Composition according to claim 2 wherein the titanium dioxide-pigmented cellulosic polymer is a cellulose acetate polymer.

4. Composition of claim 2 wherein the cellulosic polymer is a cellulose acetate propionate polymer.

5. Composition of claim 2 wherein the cellulosic polymer is a cellulose acetate butyrate polymer.

6. Composition of claim 3 wherein the stabilizing components are zinc bis(3,5-di-tert-butyl-4-hydroxybenzoate) and a compound selected from 4-(dodecyloxy)-2-hydroxybenzophenone, 2-(2H-benzotriazol-2yl)-4,6-di-tert-pentylphenol)4-methoxy-2-hydroxybenzophenone, 4-(octyloxy)-2-hydroxybenzophenone, 2-(2H-benzotriazol-2-yl)-p-cresol.

7. Composition of claim 4 wherein the stabilizing components are zinc bis(3,5-di-tert-butyl-4-hydroxybenzoate) and a compound selected from 4-(dodecyloxy)-2-hydroxybenzophenone, 2-(2H-benzotriazol-2yl)-4,6-di-tert-pentylphenol)4-methoxy-2-hydroxybenzophenone, 4-(octyloxy)-2-hydroxybenzophenone, 2-(2H-benzotriazol-2-yl)-p-cresol.

8. Composition of claim 5 wherein the stabilizing components are zinc bis(3,5-di-tert-butyl-4-hydroxybenzoate) and a compound selected from 4-(dodecyloxy)-2-hydroxybenzophenone, 2-(2H-benzotriazol-2yl)-4,6-di-tert-pentylphenol)4-methoxy-2-hydroxybenzophenone, 4-(octyloxy)-2-hydroxybenzophenone, 2-(2H-benzotriazol-2-yl)-p-cresol.

* * * * *